US008510953B2

(12) United States Patent
Brown

(10) Patent No.: US 8,510,953 B2
(45) Date of Patent: Aug. 20, 2013

(54) METHOD FOR WRAPPING A FLEXIBLE COVER SHEET ON A PANEL

(75) Inventor: Ronald H. Brown, Holland, MI (US)

(73) Assignee: Haworth, Inc., Holland, MI (US)

( * ) Notice: Subject to any disclaimer, the term of this patent is extended or adjusted under 35 U.S.C. 154(b) by 218 days.

(21) Appl. No.: 13/068,448

(22) Filed: May 11, 2011

(65) Prior Publication Data

US 2012/0285020 A1 Nov. 15, 2012

(51) Int. Cl.
*B21D 47/00* (2006.01)

(52) U.S. Cl.
USPC ...................................................... 29/897.32

(58) Field of Classification Search
USPC ...................................................... 29/897.32
See application file for complete search history.

(56) References Cited

U.S. PATENT DOCUMENTS

| 2,808,099 | A | 10/1957 | Silverman |
| 3,840,167 | A | 10/1974 | Otteman et al. |
| 4,248,657 | A | 2/1981 | Henry |
| 4,995,178 | A | 2/1991 | Randolph |
| 5,072,496 | A | 12/1991 | Radermacher |
| 5,118,374 | A | 6/1992 | Suwitoadji |
| 5,129,569 | A | 7/1992 | Stanton |
| 5,230,687 | A | 7/1993 | Lombardo et al. |
| 5,258,083 | A | 11/1993 | Monk et al. |
| 5,259,825 | A | 11/1993 | De Angelis et al. |
| 6,581,260 | B2 | 6/2003 | Kinney |
| 6,951,592 | B2 | 10/2005 | McConnell et al. |
| 7,225,852 | B2 | 6/2007 | McConnell et al. |
| 7,614,196 | B2 | 11/2009 | McConnell et al. |
| 7,789,986 | B2 | 9/2010 | Brown et al. |
| 2007/0214625 | A1 | 9/2007 | Brown et al. |

OTHER PUBLICATIONS

U.S. Appl. No. 12/802,611, Applicant: Ronald H. Brown, et al. filed Jun. 10, 2010 entitled Apparatus and Process for Wrapping and Securing Edge Flaps of Flexible Cover Sheet to Panel Structure.

*Primary Examiner* — David Bryant
*Assistant Examiner* — Moshe Wilensky
(74) *Attorney, Agent, or Firm* — Warner Norcross & Judd LLP

(57) ABSTRACT

A process and apparatus for simultaneously securing opposite parallel edge flaps of a flexible cover sheet to opposite parallel edge faces of a wall panel. A pair of wiping devices move downwardly and wipe the edge flap against the edge faces and transversely tension the cover sheet. Top sweep devices move down into holding contact with the cover sheet adjacent the parallel edge faces to maintain the transverse tension in the sheet. The edge flaps are then deflected and adhesive applied to the edge faces and back surfaces of the edge flaps. The wiping devices then again wipe the flaps downward into pressed contact with the edge faces to create an adhesive securement therewith.

11 Claims, 16 Drawing Sheets

METHOD FOR WRAPPING A FLEXIBLE COVER SHEET ON A PANEL

FIELD OF THE INVENTION

This invention relates to an apparatus and process for securing a thin flexible covering sheet to a side of an upright wall panel, including tensioning of the sheet and securing of sheet edge flaps to panel edge faces.

BACKGROUND OF THE INVENTION

Wall systems defined by upright space-dividing panels are widely utilized in offices and the like to divide large open areas into smaller work spaces. Such panels, which may be of floor-to-ceiling height or of lesser height, are typically prefabricated employing a rigid ring-shaped frame surrounding a suitable core structure, with a thin flexible covering sheet positioned over the large exterior side surface of the panel and edge flaps of the covering sheet being wrapped around and secured to edge faces of the frame. The covering sheet usually constitutes a thin flexible fabric, vinyl or foil-like material, and defines the exposed side surface of the assembled wall panel.

In a typical wall panel of the aforementioned type, it is conventional to secure the covering sheet to the frame by inserting the cover sheet edge flaps into grooves or channels which extend lengthwise along the edge faces of the frame, with the flaps being held within the channels by an elongate retaining element, often referred to as a spline. The elongate retaining element is generally of paper or elastomeric material so that it can be compressed into the channel and wedgingly hold the edge flap in engagement therein. This construction is and has been widely used since it facilitates removal and replacement of the cover sheet when desired. This securement process, however, is difficult and labor intensive inasmuch as the spline is typically progressively inserted lengthwise along the channel by a manually manipulated tool which requires significant manual manipulation and introduces variations into the assembly process with respect to the overall quality of the securement and the tensioning of the cover sheet on the assembled wall panel.

An example of a known wall panel employing a construction similar to that described above is illustrated by U.S. Pat. No. 5,606,836, owned by the Assignee hereof.

While the above described technique has and continues to be successfully utilized in many situations, nevertheless it has been discovered that the technique of employing a spline-and-groove securing technique results in additional complications when dealing with newer types of fabric cover sheets currently in use, specifically cover sheets or fabric sheets which have a loose weave pattern and/or employ plastic fibers as such fabrics are more easily distorted and have a more slippery texture, whereby application of the fabric and the securement thereof using the spline technique induces additional problems with respect to either slippage of the fabric and/or distortion of the fabric during the assembly process. These slippage and/or distortion problems can significantly and adversely impact the overall visual and hence aesthetic appearance of the wall panel.

SUMMARY OF THE INVENTION

Accordingly, it is an object of this invention to provide an improved apparatus, and related process, which facilitates and at least significantly automates the tensioning of a flexible cover sheet positioned over a large exterior side surface of a wall panel structure, and which effects securement of edge flaps associated with the cover sheet to the edge faces of the wall panel frame.

It is a further object of the invention to provide an improved apparatus, and process associated therewith, for permitting initial tensioning of the cover sheet by initially folding and wiping the edge flaps into pressed contact with edge surfaces of the frame to effect initial tensioning of the sheet, preferably followed by subsequent additional tensioning by engaging the cover sheet with sweeping blades in close proximity to the panel edges and then sweeping the blades outwardly toward the respective edges, followed by subsequent manipulation of wiping blades which folds the edge flaps upwardly to permit adhesive to be applied to the back sides thereof, after which the wiping blades wipe the edge flaps downwardly into contacting engagement with the edge surfaces of the frame to effect adhesive securement therewith. With this improved apparatus, and process, the edge flaps can be secured directly to a flat edge surface associated with the frame, or in an alternative arrangement a portion of the edge flap can be inserted into a groove associated with the frame edge face so as to provide a construction which permits field-replacement of the covering sheet and mounting of a new covering sheet and securement thereof in a conventional manner utilizing a spline insertable into the groove.

In the apparatus of the present invention, as aforementioned, there is provided an upwardly-facing working station for accommodating a horizontally-oriented wall panel structure thereon, which wall panel structure has a flexible covering sheet positioned to extend wholly over the upwardly-facing side surface of the wall panel structure and has flexible edge flaps which extend along each edge of the wall panel structure and protrude outwardly therefrom by a predetermined distance which is less than the thickness of the wall panel structure. The covering sheet is not attached to the upward-facing side surface of the wall panel structure to permit suitable movement of the covering sheet during tensioning. A cover attaching arrangement is movably supported above the working station, and includes a pair of flap wiping assemblies positioned above opposite side edges of the wall panel assembly. The wiping assemblies each include an elongate wiping blade, preferably of an elastomeric material, which when moved downwardly contacts the edge flap along the entire lengthwise extent of the wall panel edge so as to press the flap downwardly along the respective edge surface. The cover attaching arrangement also includes a pair of sweeping devices positioned in close proximity to the respective wiping assemblies and disposed over the working station in close proximity to the opposite edge faces of the wall panel structure. These sweeping devices each include a horizontally elongate sweep blade, preferably of an elastomeric material, which is moved downwardly into engagement with the upward-facing cover sheet close to and generally parallel with the adjacent edge face, and then is moved outwardly to a position generally at the edge surface to effect final tensioning and holding of the covering sheet. The wiping blades are then moved upwardly to deflect the edge flaps upwardly against a suitable support surface associated with the respective sweeping device, after which a suitable adhesive applicator, such as a spray device, applies a suitable adhesive to the exposed back side of the upwardly-deflected edge flap, and also applies adhesive to the exposed edge surface of the panel frame. Thereafter the wiping blades are disengaged from the edge flaps, whereupon the edge flaps fold or fall downwardly so as to hang adjacent the edge surfaces. The wiping blades are then moved downwardly and effects pressing engagement of the edge flaps into adhesive contact with the opposed facing surfaces on the edge frames of the wall panel structure. Thereafter the wiping and sweeping blades are disengaged from the fabric covering and returned to their initial positions to permit initiation of a further securement operation.

In the aforesaid operation, the edge frame of the wall panel structure can be provided with a conventional groove extending lengthwise along the edge face, and the edge flap can be sized to include suitable material for accommodation within the edge groove during the securement process. In such case the wiping assembly is provided with a tucking blade disposed in close proximity to the elastomeric wiping blade. The tucking blade is activated, after the wiping blade has wiped downwardly and adhesively contacted the edge flap against an opposed flat surface on the edge frame, so as to insert a lower free end portion of the edge flap into the groove. This groove preferably has adhesive on the surfaces thereof as applied during the adhesive application step, and this, coupled with the adhesive on the back side of the edge flap, cooperates to provide additional securement of the edge flap to the edge frame of the panel structure.

The apparatus and process of the present invention, as well as the aforementioned and other objects, purposes and advantages of this invention, will be apparent upon reading the following specification and inspecting the accompanying drawings.

Figure 13:
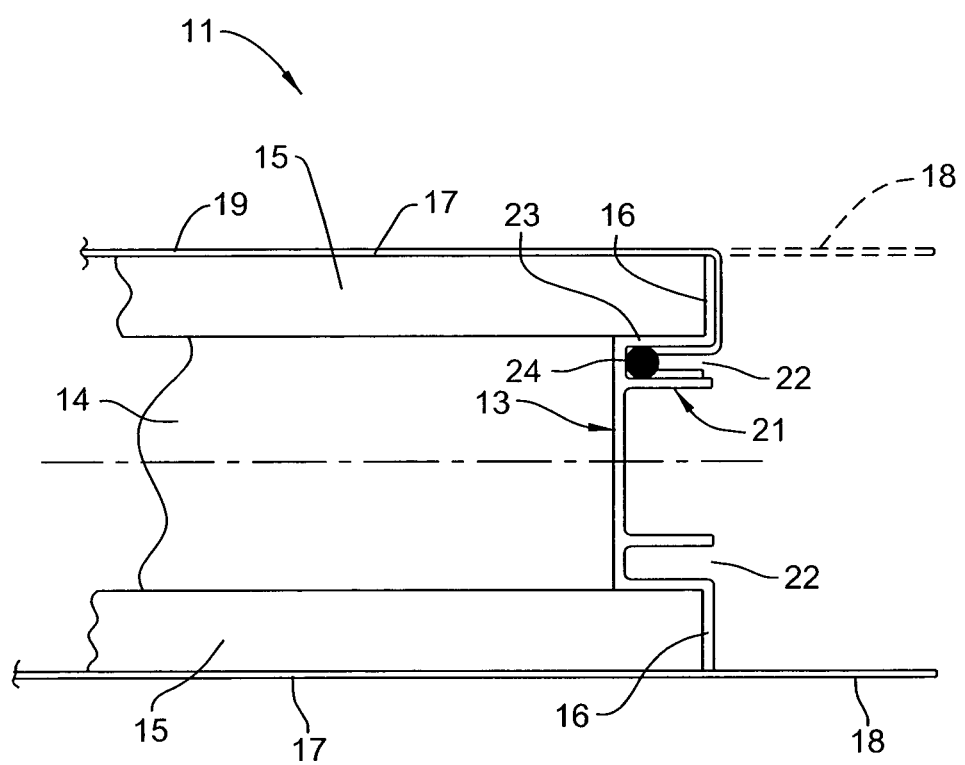
FIG. 13 is an enlarged sectional view taken generally along line 13-13 in FIG. 12 and diagrammatically illustrating a typical construction of the wall panel, including the frame structure and the provision of a securing groove in the frame edge face for securement of the edge flap therein by means of a retaining spline.

Frames 14 and 15 are views similar to FIG. 13 but showing the securement of the cover sheet edge flap in accordance with the present invention.

Figure 1:
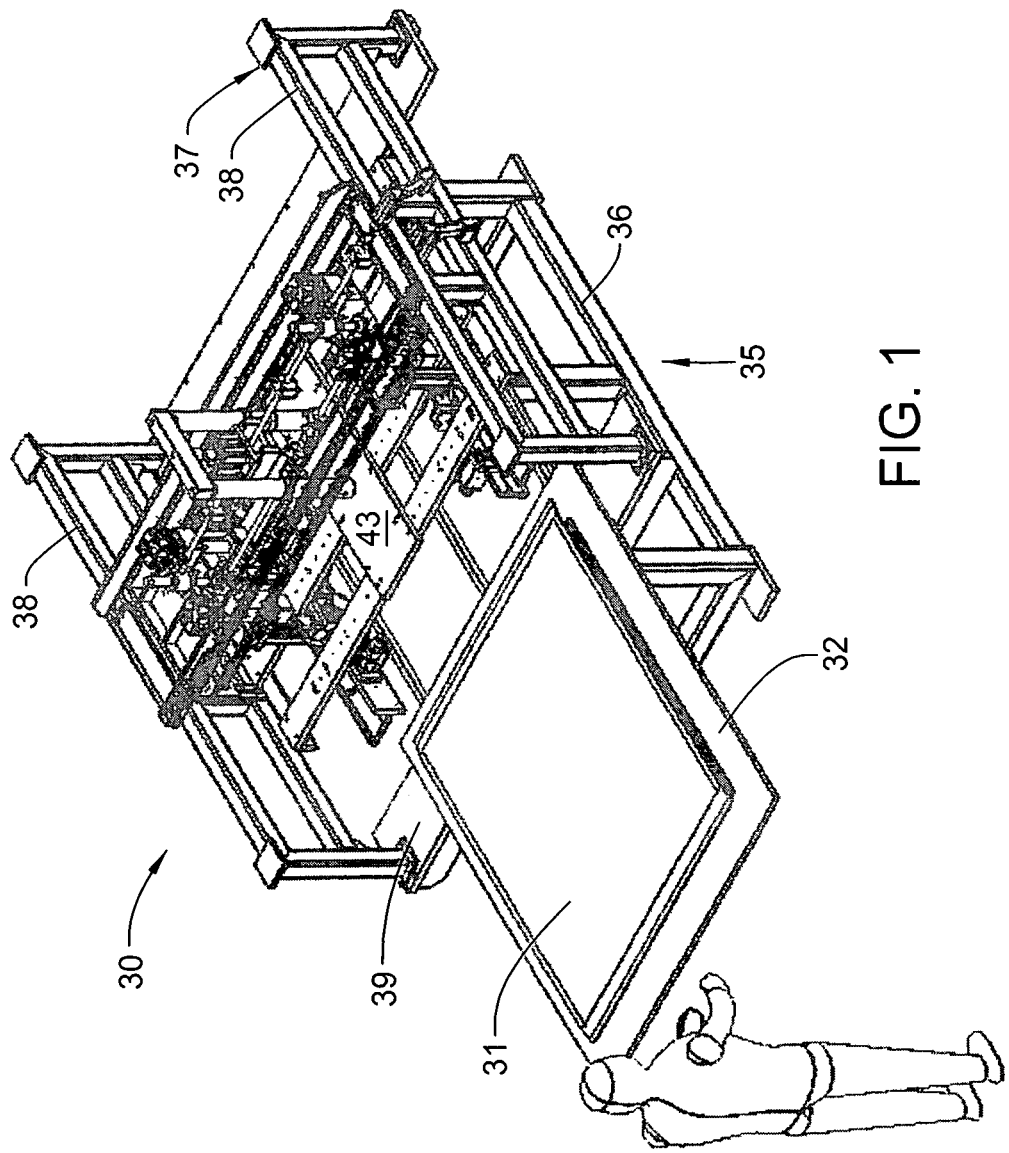
FIG. 1 is a perspective view of an apparatus for securing edge flaps of a covering sheet to a wall panel structure, which apparatus in FIG. 1 illustrates a wall panel structure being fed into one end of the apparatus for disposition at the working station thereof.
Figure 2:
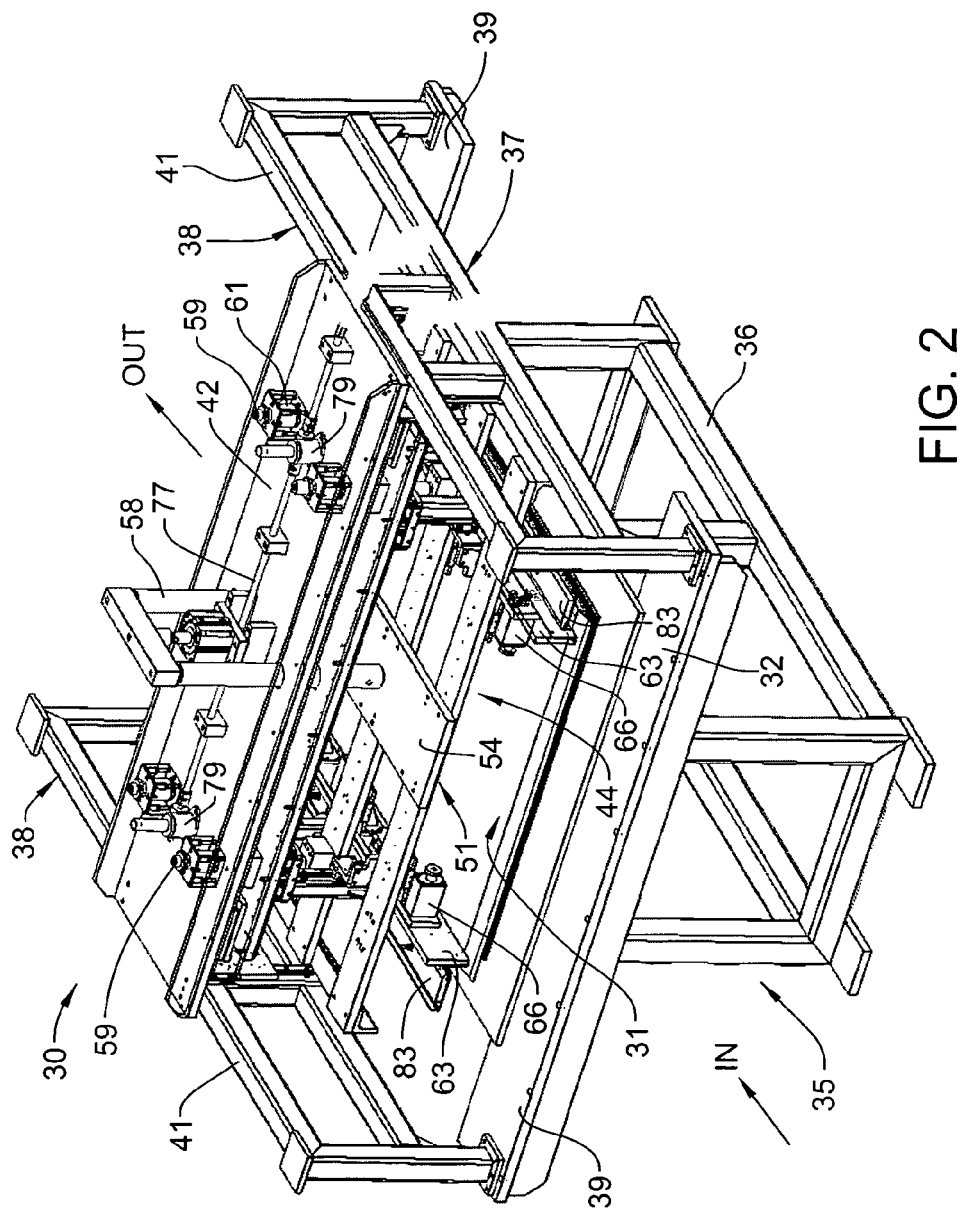
FIG. 2 is an enlarged perspective view of the apparatus shown in FIG. 1.
Figure 3:
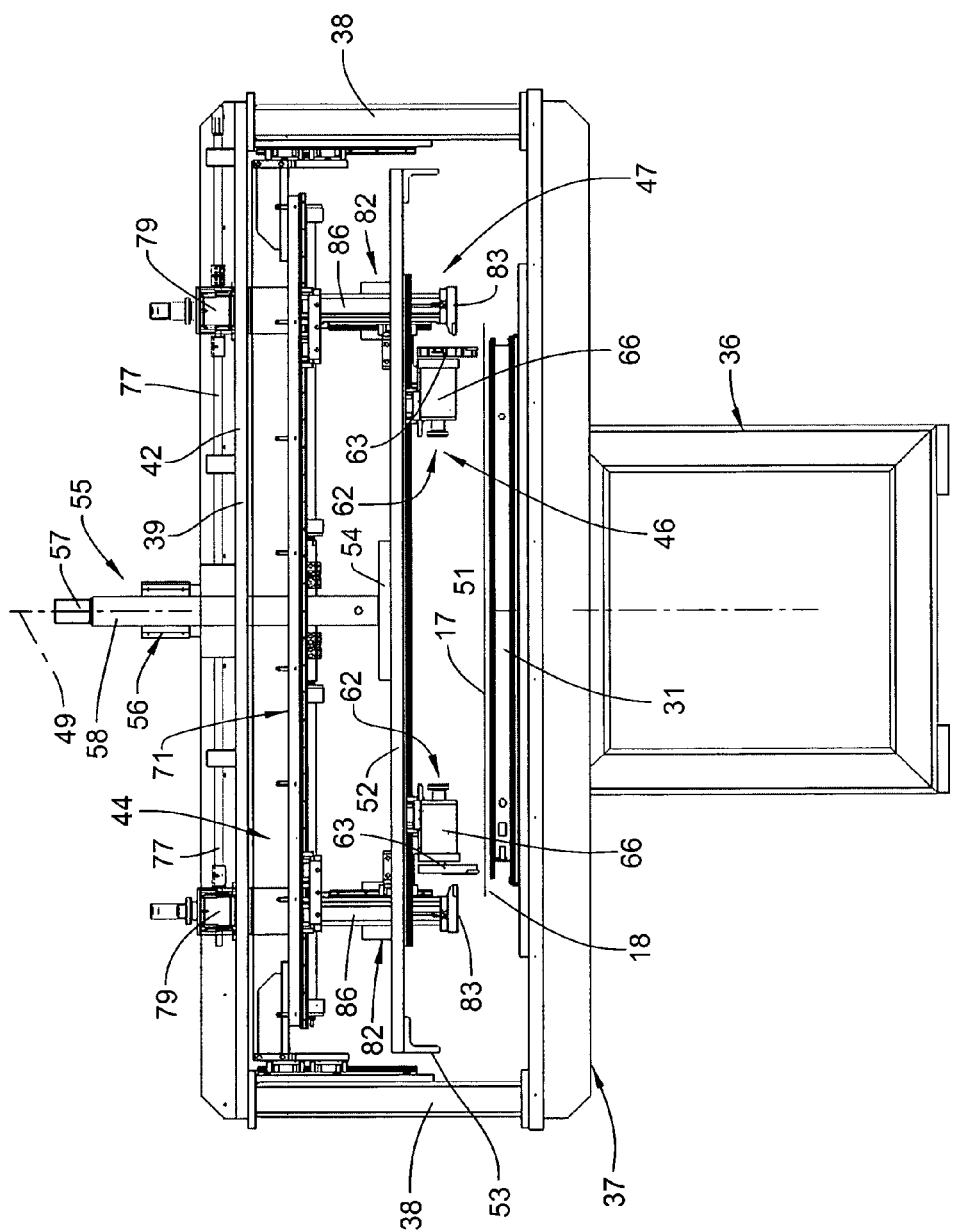
FIG. 3 is a front elevational view showing the input end of the apparatus of FIG. 2, and showing the sweeping and wiping devices in their retracted inactive positions.
Figure 4:
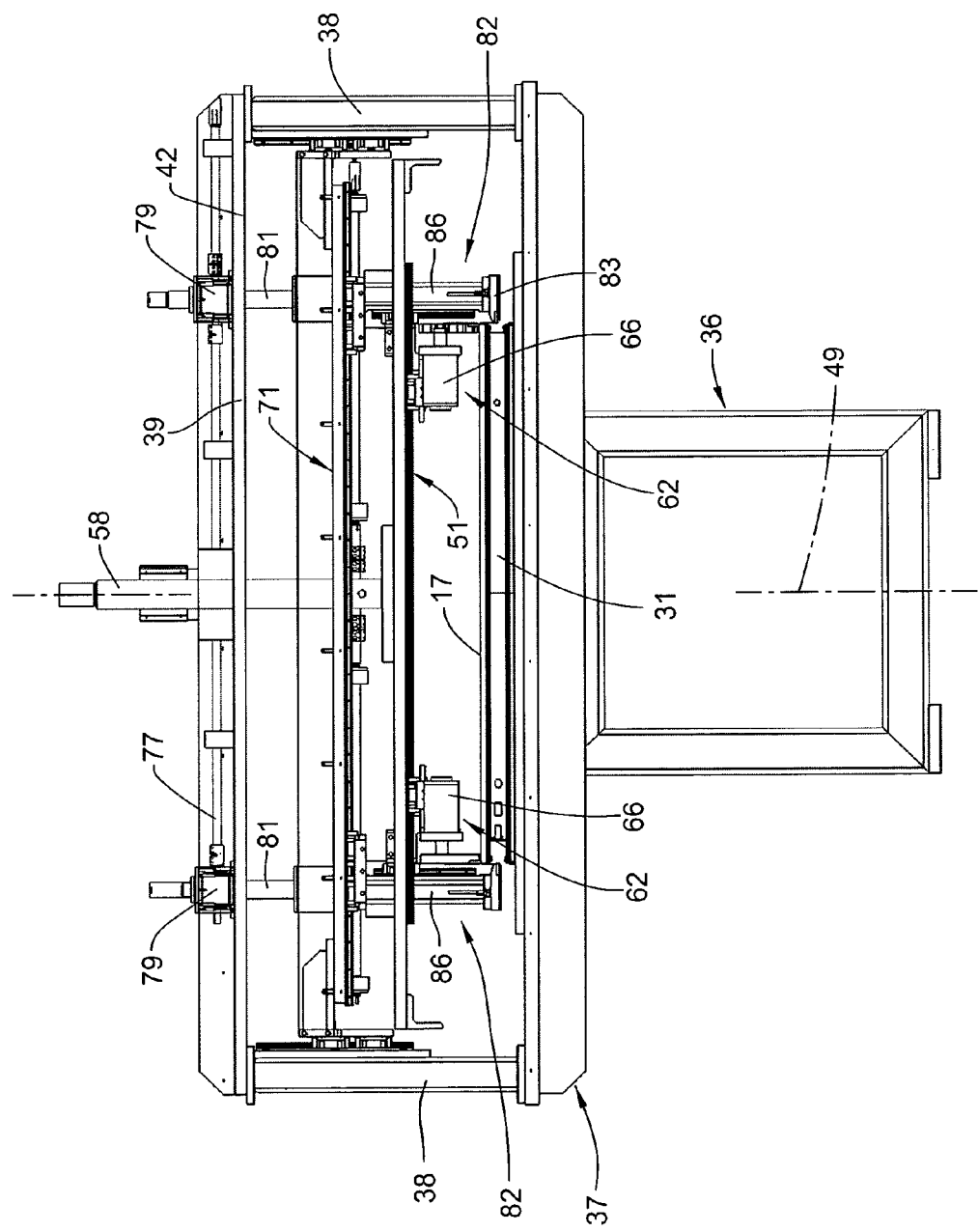
FIG. 4 is a view corresponding to FIG. 3 but showing the sweeping and wiping devices in their lowered activated positions.
Figure 5:
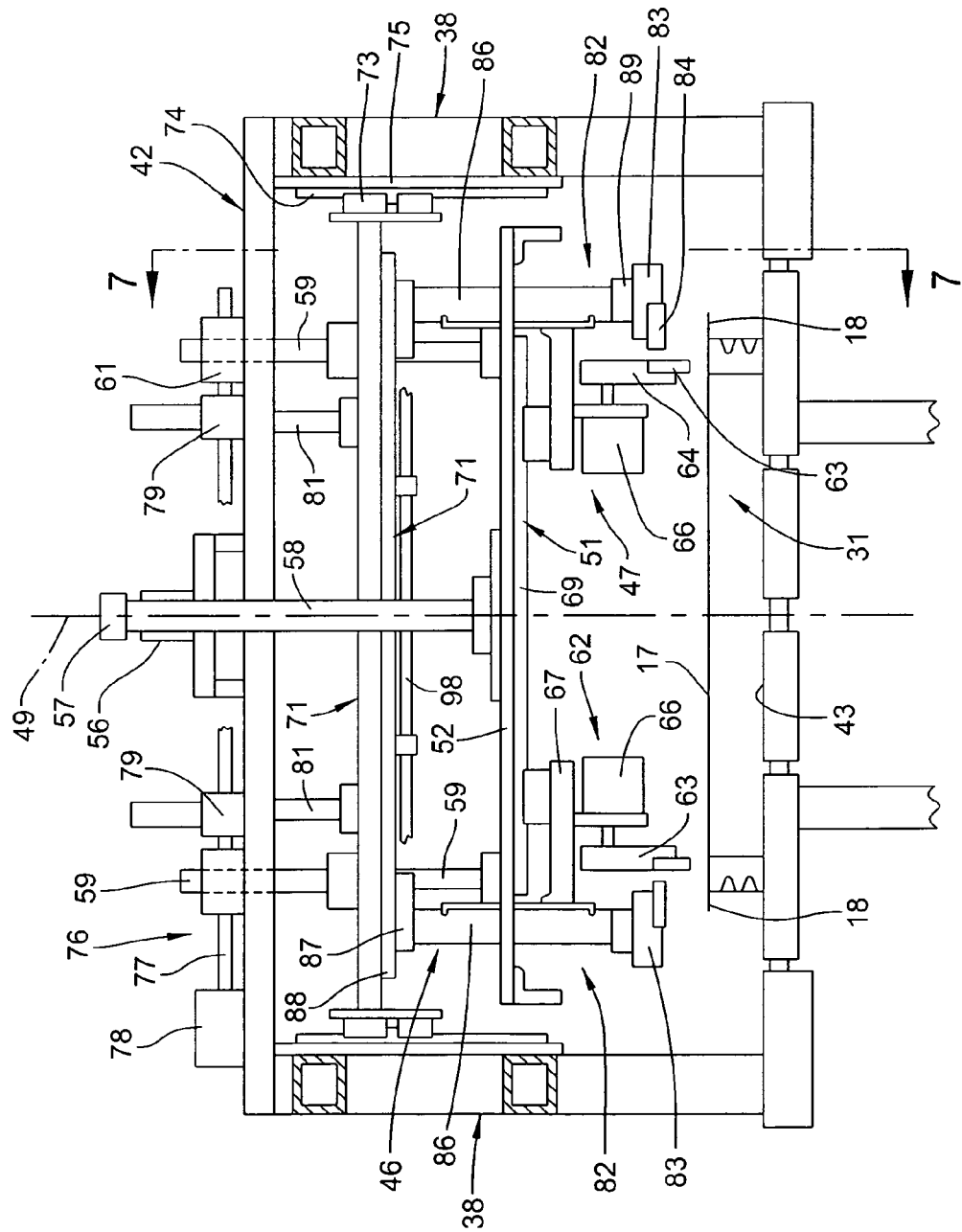
FIG. 5 is a diagrammatic line drawing showing an input-end elevational view similar to FIG. 3 wherein the wiping and sweeping devices are in their raised inactive positions, prior to their being engaged with a workpiece or wall panel structure disposed at the working station.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from the geometric center of the apparatus or panel, and designated parts thereof. The word "front" when used in reference to the wall panel will refer to the exterior side thereof which faces outwardly when the panel is mounted in its normal upright position, and the word "front" when used in reference to the apparatus will refer to the side of the machine which is used for inputting the wall panel structure to the working station, which side is designated by the arrow "IN" in FIG. 2. Said terminology will include the words specifically mentioned, derivatives thereof, and words of similar input.

DETAILED DESCRIPTION

Figure 12:
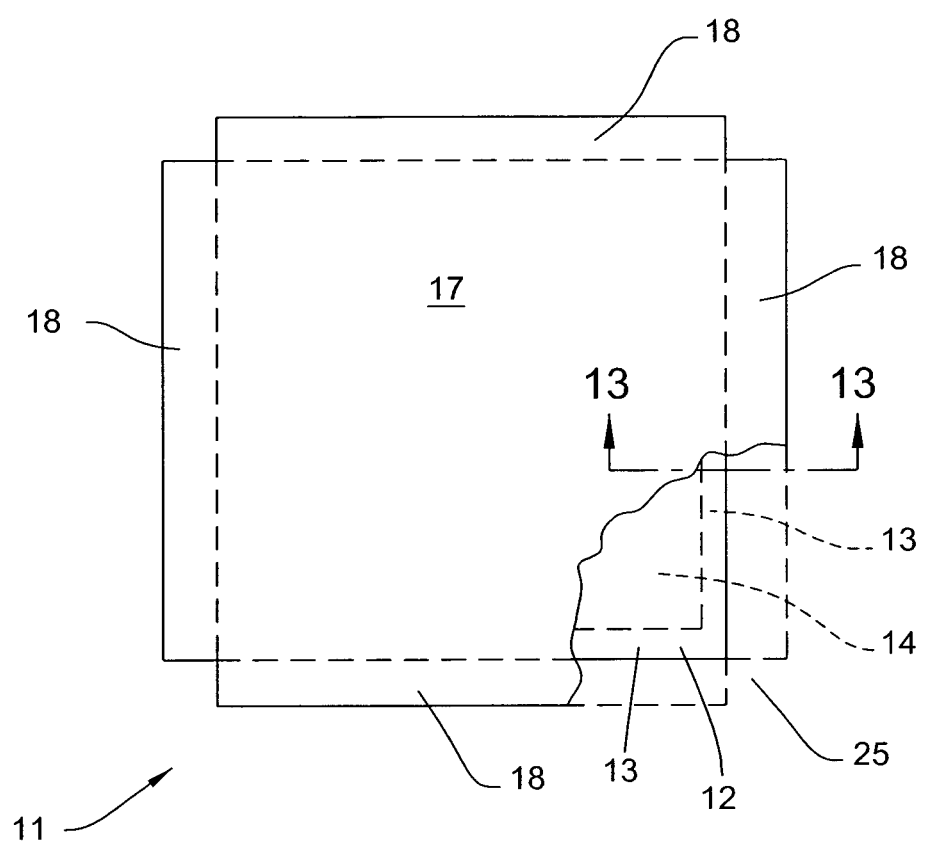
FIG. 12 is a diagrammatic plan view of a wall panel structure having a flexible covering sheet disposed so as to extend over one large side face thereof, with the covering sheet having flexible edge flaps which extend along each edge of the wall panel structure and protrude outwardly so as to be folded downwardly and secured to the respective edge surface of the wall panel structure.

Referring initially to FIGS. 12 and 13, there is illustrated a known construction for a wall panel structure 11, which construction is similar to that illustrated in the aforementioned '836 patent. The wall panel structure 11 includes a substrate defined primarily by a generally rectangular ring-shaped rigid frame 12 formed by elongate frame elements 13 which extend along each edge of the panel and, at their adjacent ends, are rigidly joined to define the corners of the panel. The interior of the ring-shaped frame is typically provided with a suitable and conventional core structure 14 therein. The wall panel 11 in the illustrated arrangement has the sides thereof defined by generally sheet-like or plate-like side members 15 which, in the illustrated embodiment, are constructed similar to dry wall sheets although other similar constructions are obviously suitable. The sheets 15 are seated within and on a boundary flange 16 which defines the outer surface for the edge face of the panel. The flange 16 joins to a further wall or flange 23 which protrudes inwardly and functions as a rear support wall for the side member 15.

The wall panel substrate has a thin flexible covering sheet 17 positioned to extend over the entire exterior side face 19 thereof. This covering sheet 17 additionally has edge portions or flaps 18 which extend lengthwise along the full length of the respective edge of the panel frame and which protrude beyond this edge by a predetermined extent or distance which is less than the thickness of the wall panel substrate. The edge flap 18 is flexible and, during typical assembly, is folded downwardly to overlap the boundary flange 16 of the frame. In addition, the illustrated frame has a depressed channel structure 21 located inwardly of the flange 16 and defining an outwardly opening groove or channel 22 into which a free end part of the edge flap 18 is inserted, as illustrated in FIG. 13. The edge flap is retained in the securing groove 22 by a deformable retaining element or spline 24 which is typically manually and progressively inserted into the groove 22 along the length thereof, and which expands to effect gripping of the edge flap within the groove.

As illustrated by FIG. 12, the flexible covering 17 is preferably provided with cutouts or recesses 25 at the corners so as to minimize the amount of excess fabric material at the corner of the frame, and facilitate the securement of the edge flaps to the frame.

When the cover 17 is secured to the wall panel substrate 11 so as to complete overall assembly of the wall panel, the covering sheet 17 is free of direct attachment to the underlying side surface 19 of the wall panel substrate. Rather, the covering sheet 17 is attached solely through the attachment of the edge flaps 18 to the exposed edge faces of the frame members.

Figure 14:
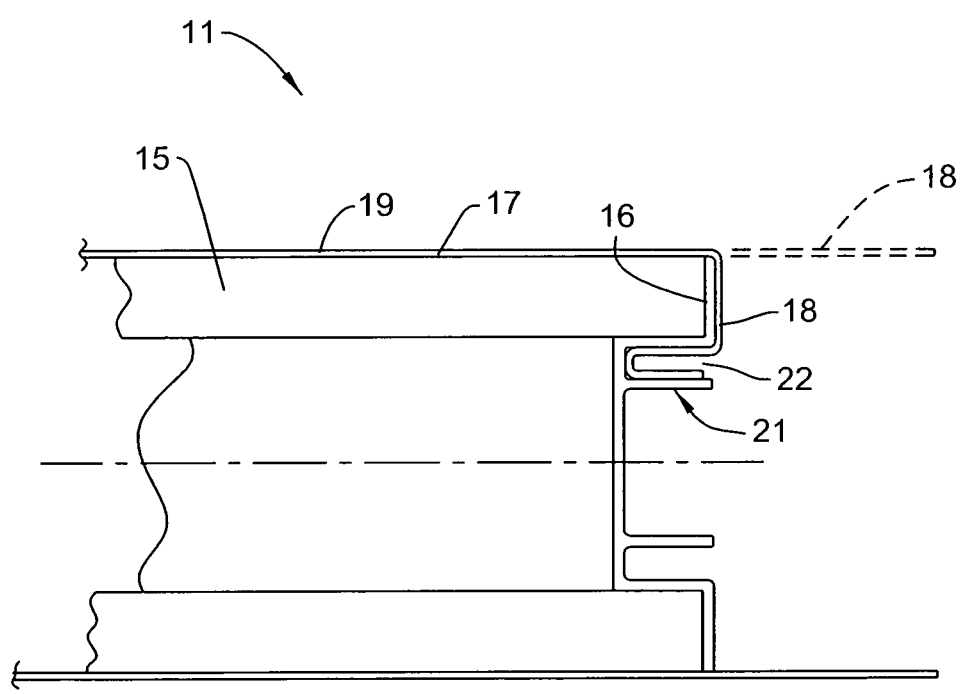

In accordance with the present invention, the securement of the cover sheet to the frame is such as to permit elimination of the retaining spline 24 illustrated in FIG. 13. Rather, the edge flap can be adhesively secured solely to an exposed surface associated with and extending lengthwise along the edge of the wall panel frame, such as the flange 16 as shown in FIG. 14. If necessary or desired, however, the edge flap 18 can be sized to include a portion adjacent an outer edge sufficient to be inserted into a groove or channel similar to the groove 22 (FIGS. 14 and 15), with this portion of the edge flap being adhesively secured to the inner wall of the groove. The apparatus and process for accomplishing this desirable construction will now be explained with reference to FIGS. 1-11.

Referring initially to FIGS. 1-5, there is illustrated an apparatus 30 according to the present invention for effecting tensioning of the flexible cover sheet and securement of the cover sheet edge flaps to edge surfaces of the wall panel frame in accordance with the brief description presented above. More specifically, the apparatus 30 cooperates with a horizontally-oriented wall panel 31 (herein referred to as a "workpiece") which corresponds generally to the construction of the wall panel described above, and which in the illustrated embodiment is disposed on a support sheet 32 to facilitate movement of the workpiece into and out of the apparatus 30.

The apparatus 30 includes a frame arrangement 35 having a lower frame 36 which mounted thereon a generally upwardly-opening U-shaped upper frame 37, the latter having right and left upright side frames 38 which are sidewardly spaced apart and are rigidly joined by generally horizontal cross frame members 39. The side frames 38 include generally parallel and horizontal elongate top frame members 41 which are rigidly joined together by a top frame structure or beam arrangement 42 extending transversely therebetween, the latter constituting a fixed upper support. This upper support 42 is spaced upwardly above a generally horizontally enlarged working station 43 defined between the right and left side frames 38 and disposed generally at the elevation of the horizontal cross frame members 39. The working station 43 functions to receive and support the workpiece 31 for permitting proper attachment of the cover sheet edge flaps thereto, as explained hereinafter. To define the working station 43, any suitable conventional platen or conveying system, such as conveying belts, may be utilized.

The overall apparatus 30 includes a cover attaching arrangement 44 which is generally supported by and positioned downwardly below the fixed upper support 42 so as to be disposed between the side frames 38 and generally above the working station 43.

The cover attaching arrangement 44 includes a first mechanism 46 which functions to engage the up-facing cover sheet 17 at locations close to but inwardly from parallel edge faces of the workpiece frame to effect outward sweeping and hence tensioning of the cover sheet. This first mechanism 46 is herein referred to as the "sweep" mechanism.

Cover attaching structure 44 also includes a second mechanism 47, herein referred to as a "wiping" mechanism, the latter effecting engagement and manipulation of the cover sheet edge flaps 18 to carry out multiple functions, including tensioning of the cover sheet, positioning of the flaps to permit application of adhesive to the back side thereof, and pressing of the adhesive-coated flaps against edge surfaces on parallel edge faces of the frame to effect attachment of the cover sheet thereto, all as explained hereinafter.

The sweeping and wiping mechanisms 46 and 47, respectively, are both mounted on the upper frame 37 for vertical movement generally parallel to the center vertical plane 49 which extends from the input to the exit or output end of the apparatus. These mechanisms 46 and 47 include respective sweeping blade and wiping blade assemblies which are disposed symmetrically on oppose sides of the central vertical plane 49 so as to constitute right and left side assemblies which respectively cooperate with the right and left edges of the workpiece, which edges extend horizontally in parallel relationship to the center plane 49, as will be apparent from the following description.

As illustrated by FIGS. 3-6, the sweeping mechanism 46 includes a generally horizontally enlarged movable lower support 51 spaced downwardly from the fixed upper support 42 and defined by a plurality of horizontally elongate plate members 52 which extend transversely in sidewardly spaced relation and which are rigidly joined together by end angles 53. A top connecting plate 54 extends over and rigidly joins the plates 52.

The lower support 51 is supported by and connected to a driving unit 55 which includes a pair of conventional pressure cylinders 56 mounted on the fixed upper support 42, and which have the extendible pressure rods thereof connected to a cross bar 57. The latter in turn rigidly joins to upper ends of a pair of vertical support rods 58 which extend downwardly and have lower ends rigidly joined to the lower support 51.

The vertical movement of lower support 51 is suitably guided by a plurality of generally parallel sliding guide rods 59 which have their lower ends anchored to the support 51, with upper ends of these guide rods 59 being slidably guided through guide blocks 61 which are secured to the upper support 42.

The sweep mechanism 46 includes a pair of sweeping devices 62 for effecting sweeping and clamping of the flexible cover sheet 17 which extends over the upward-facing side of the workpiece 31 disposed at the working station 43. These sweeping devices 62 constitute right and left devices relative to the vertical center plane 49 inasmuch as they are substantially mirror images of one another relative to this plane, and are equally spaced outwardly on opposite sides of the central plane so as to be disposed in close proximity to but upwardly above the respective right and left frame elements (i.e. edge faces) associated with the workpiece 31 disposed at the working station 43.

Each sweeping device 62 includes a generally horizontally elongate bar-like carrier 63 which extends parallel to the center plane 49, and is horizontally elongate through a length which corresponds to and generally at least slightly exceeds the length of the corresponding panel edge frame member disposed downwardly therefrom. The carrier 63 mounts thereon a sweeping member 64, generally referred to as a blade, the latter extending lengthwise along the carrier 63 and protruding downwardly and terminating in a downwardly cantilevered tip end 65 which, when the sweeping device 62 is in its raised start or inactive position, is disposed over and spaced upwardly a small distance above the flexible cover sheet 17 associated with the workpiece 31. The sweeping blade 64 is preferably constructed of an elastomeric material so as to have the ability to resiliently deform and create a resilient engagement with the cover sheet so as to not significantly harm the latter.

The carrier bar 63 and the wiping blade 64 mounted thereon are movable horizontally through at least a small extent due to their being carried on the free ends of piston rods associated with a pair of conventional pressure cylinders 66, the latter being disposed in generally parallel relationship lengthwise of the carrier bar. These cylinders 66, when activated, are capable of moving the carrier 63 and the blade 64 thereon horizontally sidewardly generally transverse to the center vertical plane 49.

Each pressure cylinder 66 is carried on a mounting member 67, the latter having a ball slide unit fixed thereto and horizontally slidably engaged on an elongate slide rail 69 fixed to the underside of the support 51 and extending horizontally therealong in generally perpendicular relation to the center vertical plane 49. This slidable mounting enables the sweep devices 62 to be slidably displaced so as to be moved toward or away from the central plane 49 to adjust the sideward spacing therebetween corresponding to the width of the workpiece 31 disposed at the working station 43.

Considering now the wiping mechanism 47, it includes a movable intermediate support 71 disposed horizontally between the side frames 38 and positioned vertically between the fixed upper support 42 and the movable lower support 51. This intermediate support 71 includes a main support plate or beam 72 which extends generally transversely between the right and left side frames 38, and opposite ends of the support beam 72 have ball slide units 73 carried thereon which in turn are engaged for vertical movement along elongate vertical slide rails 74, the latter being fixed to frame plates 75 secured to the respective side frames 38.

The intermediate support 71 is vertically movable relative to the upper support 42, and independently of the lower support 51. The movement of the intermediate support 71 is controlled by a drive system 76 including a screw-type drive shaft 77 which is supported on and extends horizontally along the upper support 42 in generally perpendicular relationship to the center vertical plane 49. This drive shaft 77 is rotated by a suitable drive device such as a reversible drive motor 78. The drive shaft 77 has screw portions adjacent opposite ends, which screw portions are of opposite hand and are respectively engaged with conventional jack-type drive screw units 79. Each screw section of the drive shaft 77 is engaged with a nut associated with the respective drive screw unit 79, which nut in turn cooperates with an output screw shaft 81 associated therewith to effect vertical displacement of the shaft 81. The shaft 81 in turn has a lower end thereof coupled to the intermediate support 71 so as to effect desired vertical displacement thereof, which displacement is slidably guided and controlled by the cooperation between the slide units 68 and the slide rails 69.

Considering now the wiping mechanism 47, it includes a pair of wiping assemblies 82 which are carried on and project downwardly from the intermediate support 71, constituting right and left units inasmuch as they are symmetrical to one another and symmetrically disposed on opposite sides of the center vertical plane 49. The wiping units 62 are positioned generally above and adjacent the respective edge faces of the workpiece 31 disposed at the working station 43, and are positioned so that they are disposed adjacent and slightly outwardly of the respectively adjacent sweeping device 62.

Each wiping assembly 82 includes an elongate bar-like carrier 83 which extends horizontally generally parallel to the center vertical plane 49 and throughout at least the length of the adjacent horizontal edge face of the workpiece. This carrier 83 mounts thereon a wiping member 84, herein referred to as a blade, which projects horizontally inwardly and terminates at a tip end 85 which is cantilevered generally horizontally inwardly toward the central vertical plane 49. This wiping blade 84 is preferably constructed of an elastomeric material having substantial resiliency so as to permit it to resiliently act on and contact the edge flap of the fabric cover sheet without causing any significant damage thereto.

The elongate carrier 83 and the wiping blade 84 extending lengthwise therealong are mounted to the lower ends of a pair of vertically elongate supports or columns 86 which are disposed in spaced front-to-back relationship on the apparatus, and which project upwardly in parallel relationship for connection to the intermediate support 71. Each upright support 86, at its upper end, has a slide unit 87 slidably engaged with a horizontally elongate slide rail 88 which is fixed to the underside of the intermediate support 71 and extends transversely so as to be elongated generally perpendicular to the center vertical plane 49. This slidable mounting enables the right and left wiping assemblies 82 to be horizontally moved inwardly or outwardly relative to the center vertical plane 49 so as to adjust for different widths of workpieces.

The bar 84 as carried on the lower ends of the support columns 86 includes a horizontal slide connection defined by a slide unit 89 carried on the lower end of the support column and engaged with a horizontally elongate slide rail 91 which is mounted on and extends transversely of the blade carrier 83. This connection between slide 89 and slide rail 91 enables the blade carrier 83 and the blade 84 mounted thereon to be horizontally displaced generally transverse to the central vertical plan 49 through at least a small distance. To permit such sideward horizontal displacement of the carrier 83, the latter is connected to the piston rods of a pair of pressure cylinders 92 which in turn are carried on the support columns 86, whereby energization of pressure cylinders 92 enables the carrier 83 to be horizontally sidewardly displaced inwardly or outwardly relative to the center plane 49.

In situations where the edge flap 18 of the fabric cover 17 is sized so as to have a part thereof inserted into a channel or groove in the manner illustrated by FIG. 14, then the carrier 83 also mounts a movable inserter or plunger 93 which is supported for horizontal displacement sidewardly (i.e., generally transversely with respect to the center plane 49), whereby a tip end 94 of the inserter 93 can be moved horizontally inwardly to permit insertion of the lower portion of the edge flap 18 into a groove or channel, such as groove 22 illustrated by FIG. 14.

The inserter 93 extends horizontally lengthwise along the carrier 83, and is selectively horizontally movable between extended and retracted positions by suitable drive devices, such as one or more pressure cylinders 95 which are carried on the carrier 83 and have the piston rods thereof coupled to the inserter 93 for controlling the horizontal sliding movement thereof.

Figure 6:
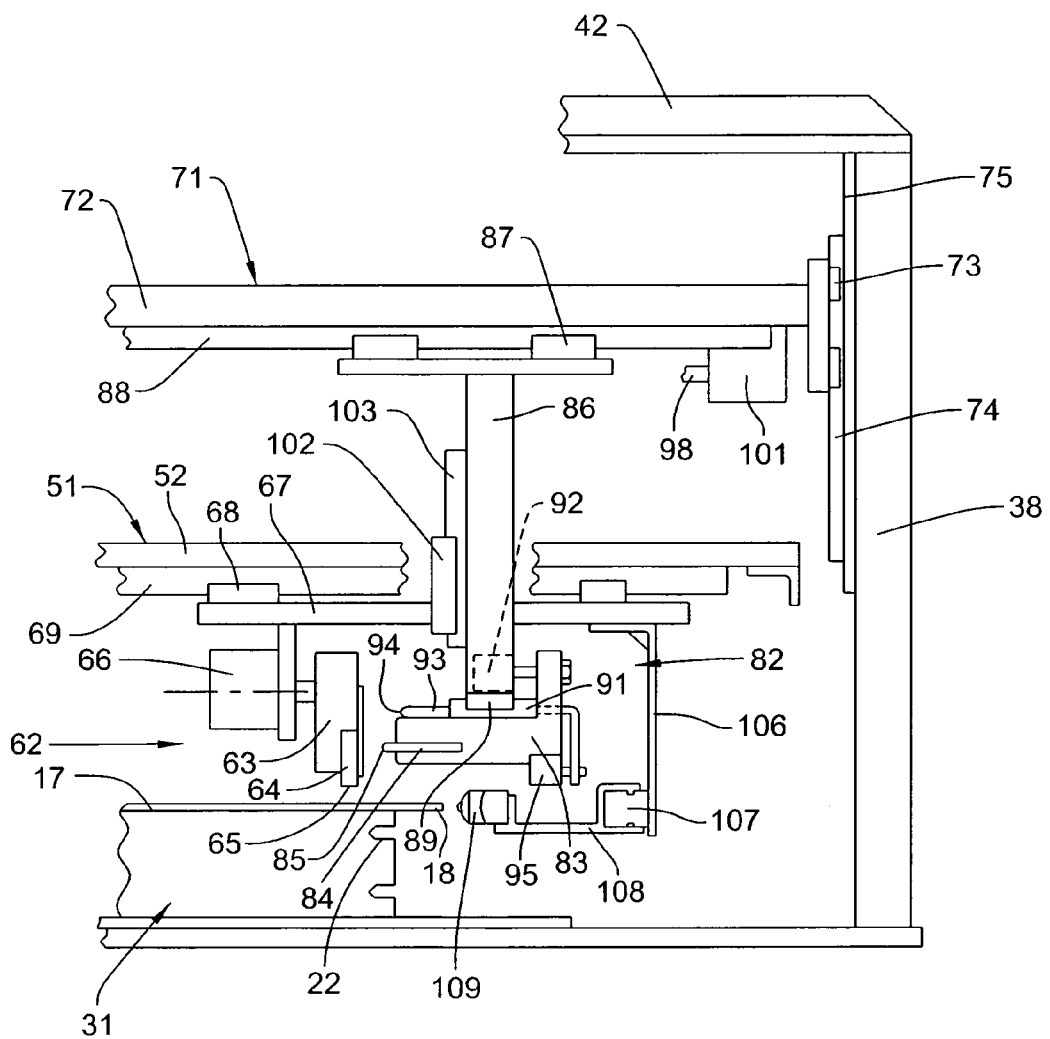
FIG. 6 is a diagrammatic line drawing, on an enlarged scale, showing the sweeping and wiping devices associated with the right side of the apparatus shown in FIG. 5.
Figure 7:
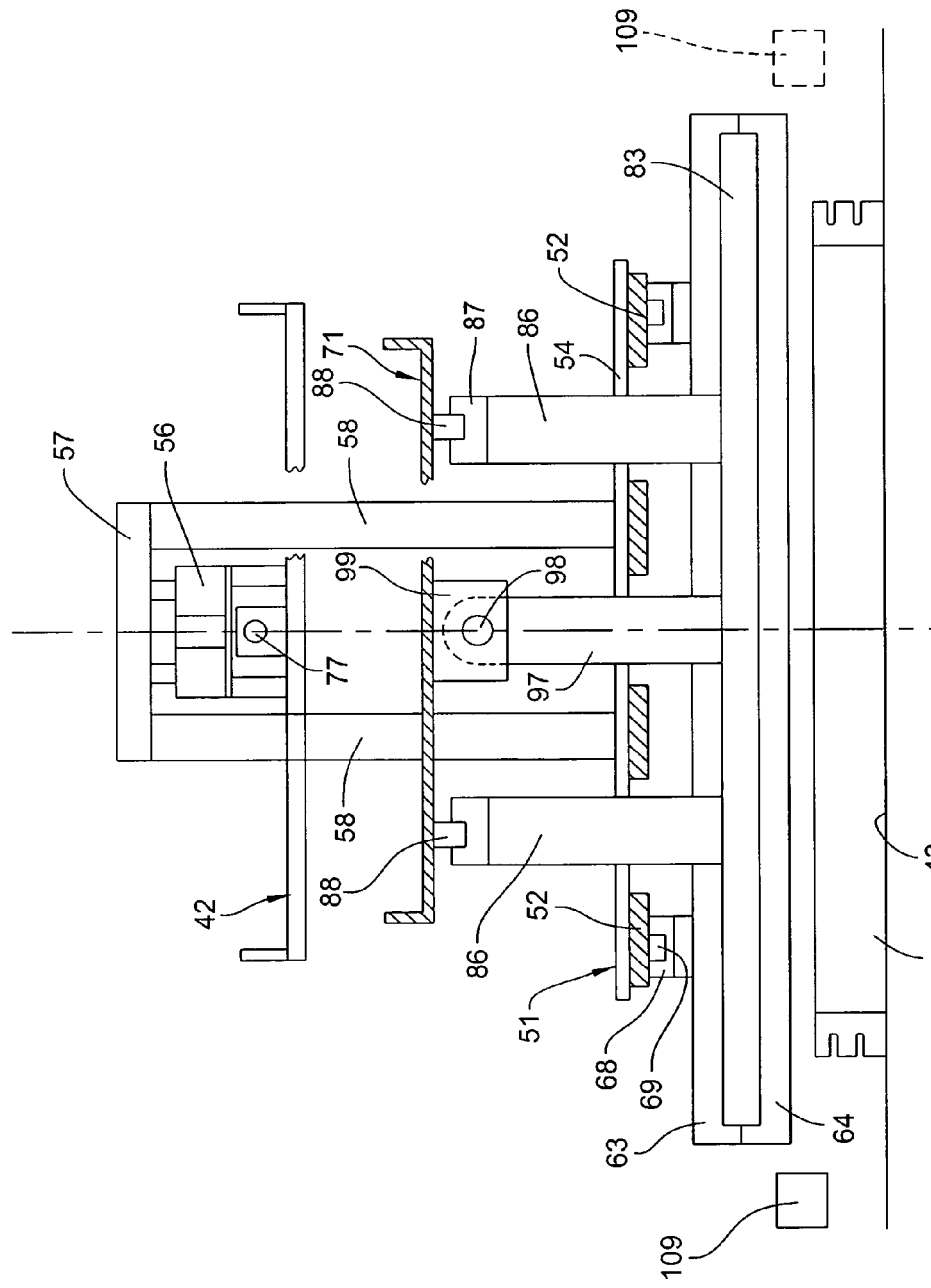
FIG. 7 is a diagrammatic line drawing taken generally along line 7-7 in FIG. 5.

To control sideward positioning and spacing of the right and left wiping assemblies 82 in accordance with the width of the workpiece 31 disposed at the working station 43, the carrier 83 associated with each wiping mechanism 82 has, as illustrated in FIG. 7, a drive arm 97 fixed thereto and projecting vertically upwardly thereof. This drive arm 97 at its upper end has a nut part which is threadably engaged with a threaded screw section of a drive shaft 98. This drive shaft 98 extends horizontally along the underside of the intermediate support 71 in generally perpendicular relationship to the center plane 49, and is rotatably supported by appropriate support bearings 99. The drive shaft 98, on opposite sides of the central plane, is provided with opposite-hand threads so that engagement with the drive arms 97 associated with the right and left wiping device 62 causes these devices to simultaneously and synchronously move either inwardly or outwardly relative to the center plane 49, depending upon the direction of shaft rotation. The rotation of shaft 98 is accomplished by any conventional suitable drive device, such as a reversible drive motor 101 as diagrammatically illustrated in FIG. 6.

To simultaneously adjust and control the positioning of the sweeping devices 62 in correspondence with the wiping devices 82, the support column 86 associated with each wiping device has a vertically elongate slide rail 103 fixed thereto, and the latter is engaged by a slide unit 102 which is fixed to the mounting member 67 of the respectively adjacent sweeping device 62. Hence, whenever the sideward positioning of the wiping units 82 is adjusted, a corresponding sideward adjustment occurs in the positioning of the sweeping units 62, thereby maintaining the desired sideward positional relationship between each wiping device 82 and is respectively adjacent sweeping device 62.

The overall cover attaching arrangement 44 also preferably includes, as illustrated in FIG. 6, an adhesive applicator arrangement 105 associated with each of the right and left sides of the apparatus, and specifically associated with each of the right and left sweeping devices 62. The adhesive applicator 105, as illustrated diagrammatically in FIG. 6, includes a support bracket arrangement 106 which is fixed to and projects downwardly from the mounting plate 67 of the sweeping device, with a pair of such brackets 106 preferably being disposed adjacent each end (i.e., adjacent both the inlet and outlet end) of the apparatus. These brackets 106 mount thereon a horizontally elongate drive unit 107, such as a conventional horizontally elongate rotatable screw which cooperates with a traveling nut movable lengthwise along the screw in dependence on the direction of screw rotation. The traveling nut of this conventional screw arrangement in turn is coupled to and carries a moving arm 108 which, at its outer end, carries a conventional spray head or nozzle 109, the latter being connected through suitable hoses and the like (not shown) to a conventional pressurized spray system which in turn can be suitably mounted on the frame of the overall apparatus, such as on the lower frame structure. The spray nozzle 109 is positioned so that the discharge orifice thereof is directed in close proximity to but spaced outwardly from the adjacent upper edge of the workpiece edge frame, and the nozzle preferably is configured to emit a vertical fan-shaped spray pattern. Thus, the nozzle, when moved lengthwise along the workpiece, emits a fan-shaped spray which is capable of applying an adhesive coating to the adjacent exposed edge surfaces of the workpiece, such as the flange 16 and the interior of the groove 22 illustrated in FIG. 14. This spray pattern also preferably extends upwardly a sufficient amount so as to apply adhesive to the exposed back side of the edge flap 18 when the latter is in the raised position illustrated by FIG. 11, as explained hereinafter.

The support arm 108 carrying the spray nozzle 109 thereon is preferably movable between extreme end positions, such as a first end position diagrammatically illustrated by the solid-line position of the nozzle 109 in FIG. 7, and the other extreme end position illustrated by the dotted-line position of the nozzle 109 in FIG. 7. This enables the nozzle to traverse the full length of the cover sheet edge flap, while at the same time the nozzle can be positioned outwardly beyond the ends of the wiping carrier bar 83 so as to not interfere with the desired vertical movement thereof during a normal operational sequence.

The operation of the apparatus 30 in accordance with the present invention will now be briefly summarized.

Since the apparatus 30 will typically be utilized to permit sequential processing of numerous like-sized panels, the wiping devices 82 are initially sidewardly positioned at the desired sideward spacing in accordance with the desired panel width by suitable activation of the motor 101 and drive shaft 98. This in turn causes automatic width adjustment and hence ensures proper sideward spacing of the sweeping devices 62 due to their positional control by the slide assemblies 102-103.

The workpiece which is fed into the apparatus will, of course, include a wall panel substrate having the flexible cover sheet 17 disposed over the upward-facing side surface thereof, the cover sheet being non-attached to the wall panel substrate and having edge flaps 18 which protrude outwardly beyond the edge faces of the substrate frame.

The workpiece 31 is inserted, either manually or more preferably automatically by a suitable conventional conveying system, into the input end of the apparatus 30, with the workpiece being positioned at the working station 43 by suitable and conventional guides, stops and/or position sensors, all of which are well known. With the workpiece properly positioned at the working station 43, and the respective sweeping and wiping mechanisms 46 and 47 in their retracted start positions substantially as illustrated by FIGS. 3, 5, 6 and 8, the assembly process is then formally initiated.

Figure 8:
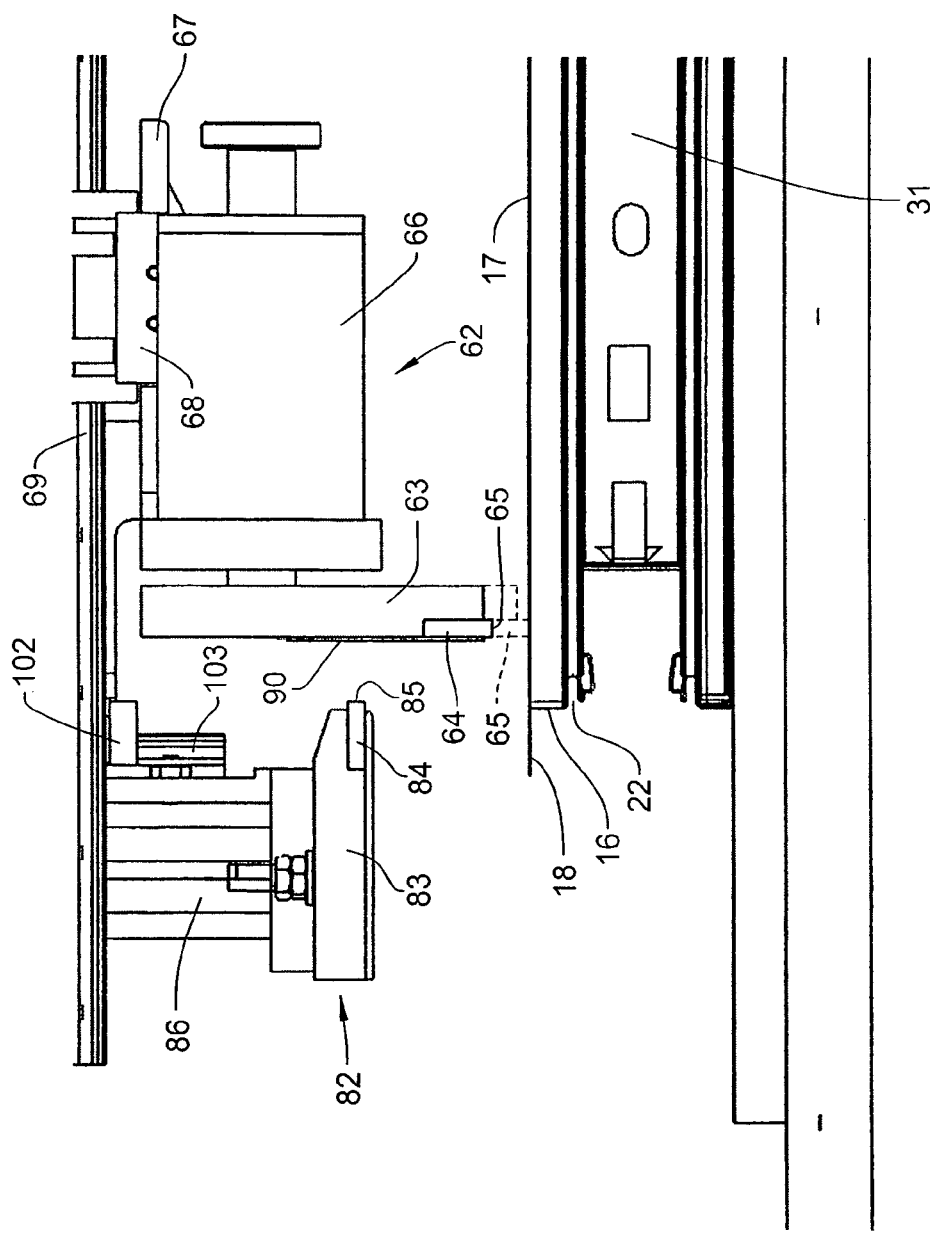
FIG. 8 is a fragmentary elevational view showing the relationship between the sweeping and wiping devices (on the left side of the apparatus) and their cooperation with the related edge of the workpiece supported at the working station, the sweeping and wiping devices being illustrated in their raised inactive or "start" positions.
Figure 8A:
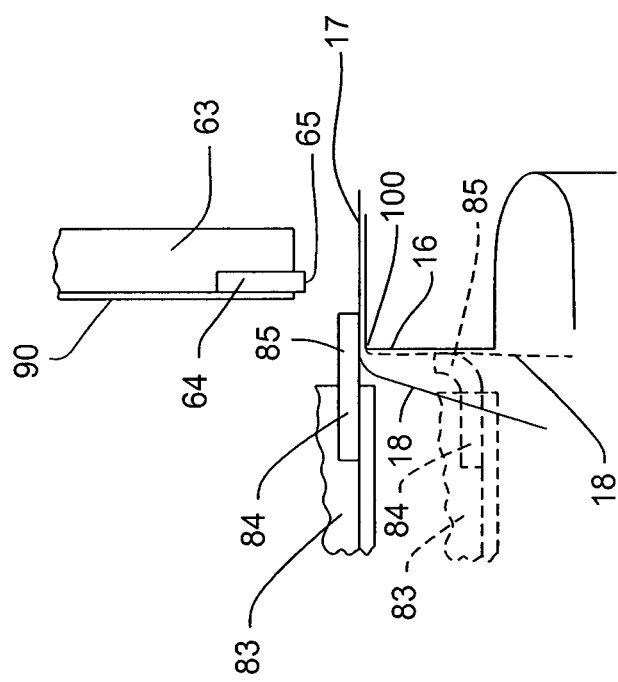
FIG. 8A is an enlarged fragmentary diagrammatic view showing the left-side sweeping and wiping devices in an intermediate operational position wherein the wiping blade engages the upper edge of the workpiece for wiping the edge flap downward of the edge face.
Figure 9:
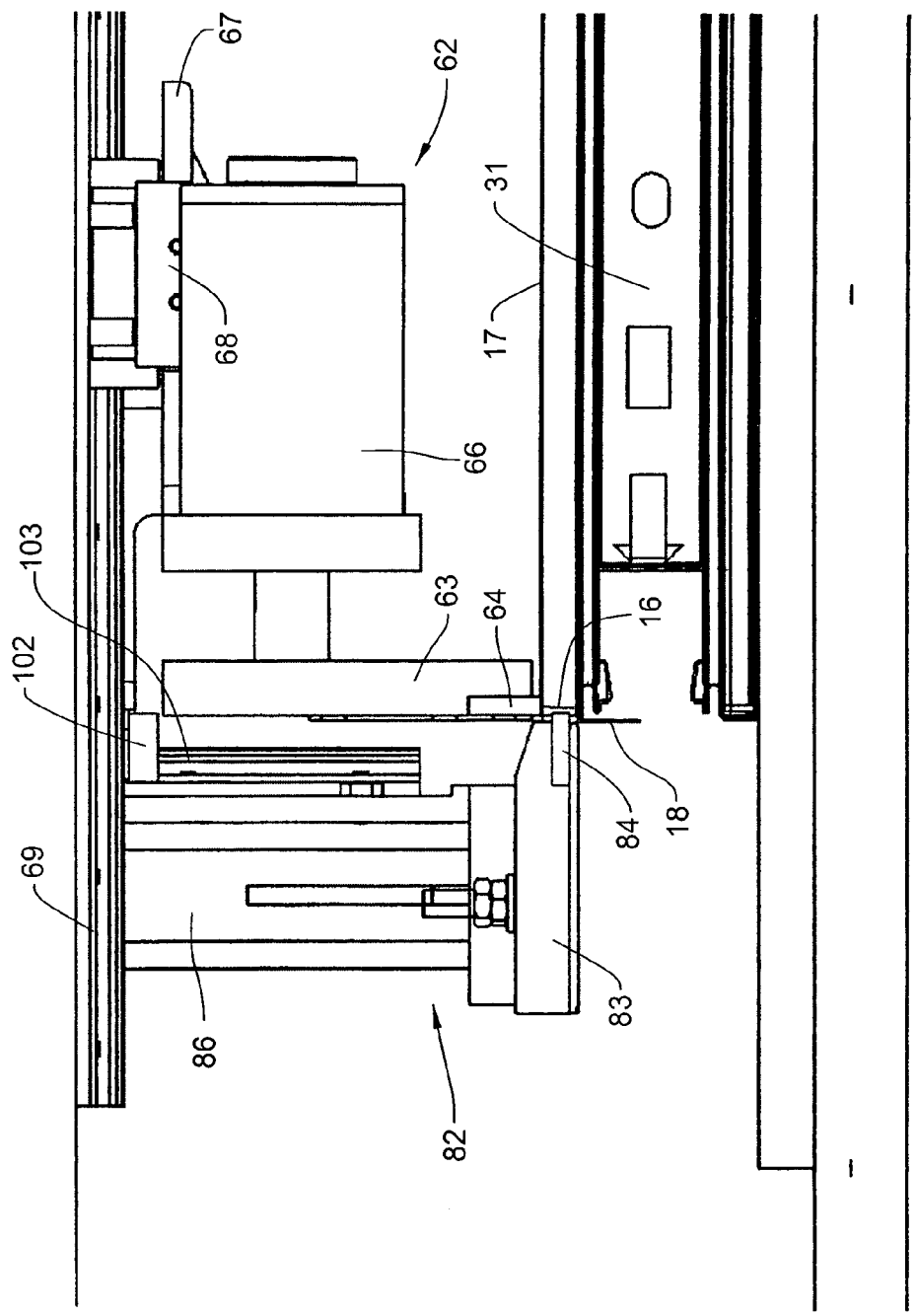
FIG. 9 is a view similar to FIG. 8 but showing the wiping device in a partially lowered position wherein the wiping blade has engaged and effected initial tensioning of the cover sheet and is engaged against the edge frame of the panel, and wherein the sweeping blade has been moved downwardly and then moved outwardly to the panel edge to effect final tensioning of the cover sheet.

To initiate the process of attaching the cover sheet 17 to the wall panel substrate, and with the arrangement in the start position illustrated by FIG. 8, the intermediate support 71 is moved downwardly so as to lower the wiping devices 82, causing the wiping blades 84 to be lowered from the raised position of FIG. 8 such that the protruding tip 85 of each elastomeric wiping blade 84 contacts the adjacent edge flap 18 generally at the upper corner-like edge 100 (FIG. 8A) of the panel frame, and then wipes downwardly, causing the end part of the blade to deflect and resiliently press the edge flap 18 against the end flange 16 as illustrated in FIGS. 8A and 9. In this latter pressing position, the lowering motion of the intermediate support 71 is stopped. Since this above-described downward wiping of the blades 84 occurs simultaneously downwardly along the protruding edge flaps 18 adjacent opposite edge faces of the workpiece 31, this hence effects initial tensioning of the covering sheet as it is stretched transversely across the panel.

After stoppage of the opposed wiping blades 84 in the holding position shown in FIG. 9, and as shown by dotted lines in FIG. 8A, the sweeping devices 62 are then energized by first lowering the lower support 51 a small amount so that the lower protruding tip ends 65 of the elastic sweeping blades 64 are moved into pressing contact with the up-facing fabric or cover sheet 17 at locations disposed adjacent but spaced inwardly from the adjacent lengthwise outer edge of the panel frame, as illustrated by dotted lines in FIG. 9. The sweeping blades 64 press against the flexible cover sheet at a distance which is in the neighborhood of about one inch, or less, spaced inwardly from the adjacent panel edge. The downward movement of the lower support 51 is stopped when the tip ends of the sweep blades 64 make the desired contact with the up-facing covering sheet, whereupon the pressure cylinders 66 of both sweeping devices 62 are energized so that carriers 63 and sweeping blades 64 mounted thereon, and disposed adjacent opposite sides of the workpiece, are simultaneously moved outwardly toward the respectively adjacent frame edge. This results in the tip ends of the elastomeric sweeping blades 64 creating sufficient frictional engagement with the covering sheet to effect additional transverse tensioning thereof, with this tension being maintained when the sweeping blades reach a disposition directly adjacent the edges of the workpiece substantially as illustrated in FIG. 9. The extension or stroke of the cylinders 66, which can be adjusted to accommodate different fabrics and different tension magnitudes, is then terminated so that the sweeping blades 64 maintain their pressing contact with the flexible cover sheet to thus maintain the desired transverse tensioning thereof.

Figure 10:
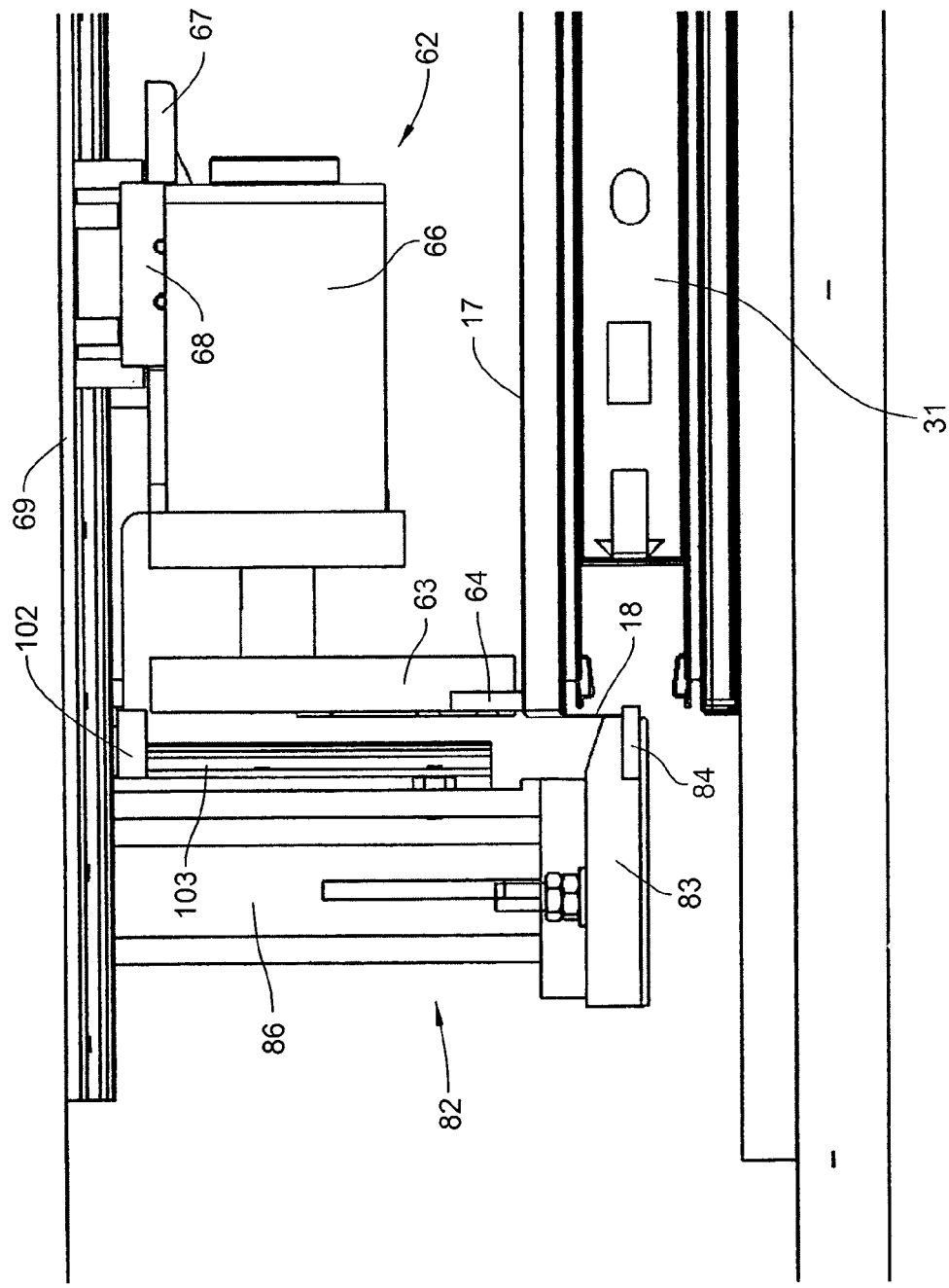
FIG. 10 is a view similar to FIG. 9 but showing the wiping blade lowered so as to disengage the edge flap, and the sweeping blade maintained in contacting engagement with the cover sheet at the wall panel edge.
Figure 11:
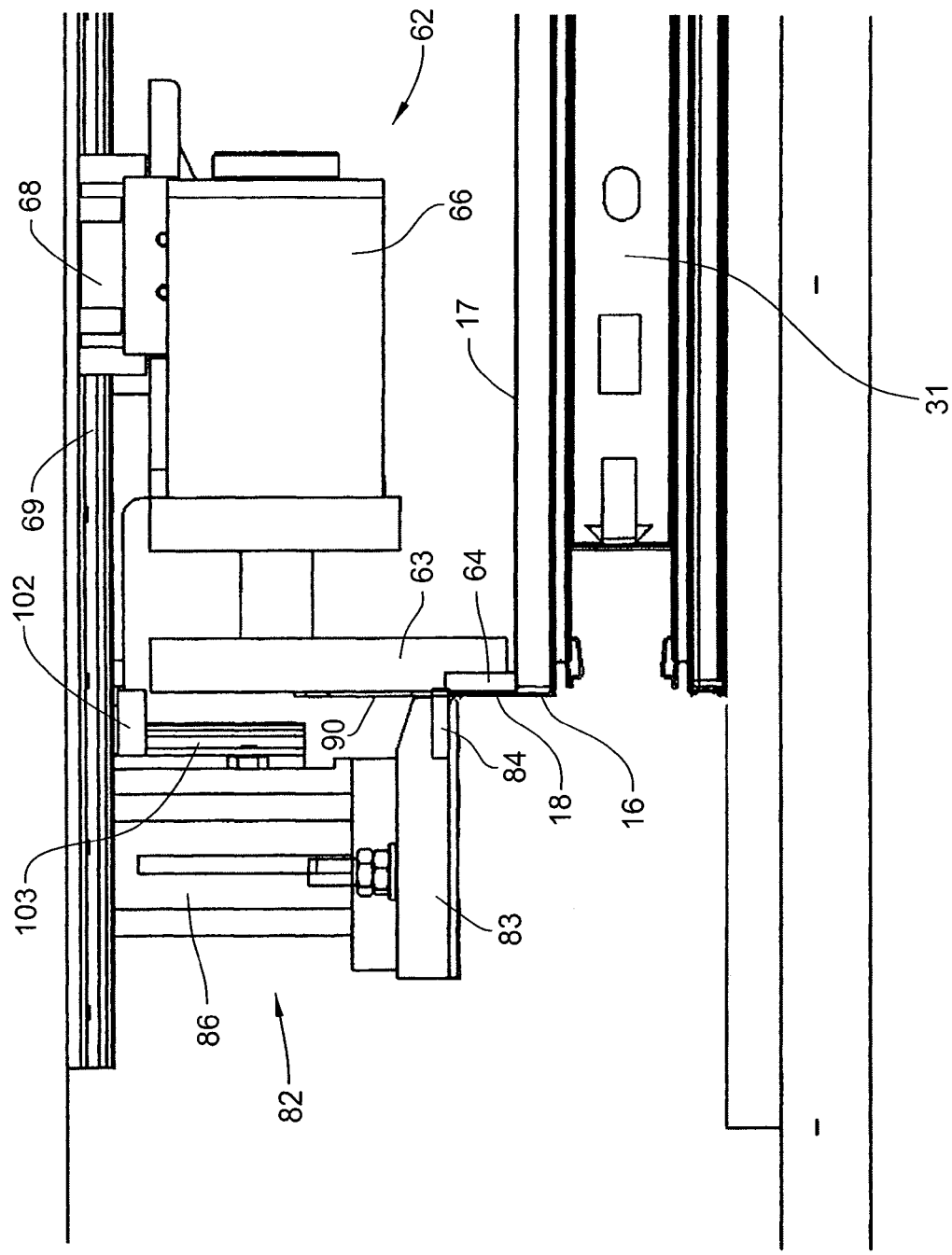
FIG. 11 corresponds generally to FIG. 10 in that the sweeping blade is still engaged with the cover sheet, but the wiping blade has been raised upwardly above the wall panel structure, causing the edge flap to be deflected upwardly and held against an exposed side face of the sweeping blade support, thereby exposing the back side of the edge flap to permit an adhesive to be applied thereto and to the exposed edge surface of the wall panel frame.

Thereafter the intermediate support 71 is lowered further downwardly, causing the carriers 83 and their respective wiper blades 84 to move downwardly to a position substantially below the lower free end of the respective edge flaps 18 substantially as illustrated in FIG. 10. The sweep blades 64, however, continues to maintain their pressing engagement with the upper surface of the cover sheet directly adjacent the respective upper edge of the panel structure.

Upon reaching the lower position illustrated by FIG. 10, the motion of the intermediate support 71 is reversed so as to lift the carriers 83 and wiping blades 84 upwardly. This causes the upper surface of the wiping blade to engage and lift the edge flaps 18 upwardly and, as the wiping blades 84 pass upwardly beyond the edge flange 16 of the panel structure, the wiping blades cause the edge flap 18 to be deflected (i.e. wiped) upwardly along the vertical face 90 of the adjacent sweep carrier 63. The upward movement of the wiper bar 83 is continued until the tip 85 of each wiper blade 84 is disposed in engagement with the upwardly-wiped edge flap 18 adjacent the upper free edge thereof, substantially as diagrammed in FIG. 11. With the edge flap 18 wiped upwardly and held in this upward extended position, the adhesive applicator device 105 is then utilized to apply adhesive to desired areas of the edge flap and wall panel frame. Specifically, the elongate drive unit 108 is energized which causes the spray nozzle 109 to progressively move lengthwise along the raised flap 18 from one end position (as indicated by solid lines 109 in FIG. 7) to the other end position (as indicated by dotted lines 109 in FIG. 7). During this horizontal traversing movement, the spray nozzle 109 emits a fan-shaped spray of adhesive which applies adhesive to the exposed back surface of the edge flap 18 at a location below the blade 84, and also applies adhesive to the exposed exterior surface of the edge flange 16, as well as into the interior of the groove 22. The spraying is suitably controlled by position sensors which sense the edges of the panel and appropriately turn the sprayer on and off when the leading and trailing edges of the panel are sensed during the traversing movement of the spray head, such sensors being well known.

Upon completion of the spraying operation, the intermediate support 71 is again activated to effect slight upward movement of the carriers 83 and blades 84 so as to cause the blades 84 to move upwardly out of engagement with the edge flaps 18. During this latter upward movement, the entire device 82 can be slightly outwardly retracted (by energizing cylinders 92) a small distance if necessary or desirable so as to prevent undesired pulling on the free edge of the flap 18 as the blade 84 is moved upwardly. After the upward displacement of blades 84 out of contact with the edge flaps, the latter will naturally fall downwardly under their own weight so as to hang generally downwardly past the edge flanges 16 of the panel. The intermediate support 71 is then moved downwardly (and the carriers 83 also moved inwardly if it was moved outwardly as discussed above), whereupon the wiping blades 84 again moves downwardly into contact with the upper longitudinal edge of the panel frame, with further downward movement causing the blades 84 to wipe downwardly along the edge flanges 16 to effect pressing of the adhesive-coated edge flaps 18 against the exterior surfaces of the edge flanges 16. This downward movement continues until the blades 84 disengage below the edge flanges 16, and the inserters 94 (FIG. 6) are aligned with the slots or grooves 22. At this position the intermediate support 71 is stopped, and the inserters 93 are slidably displaced horizontally inwardly by activation of the pressure cylinders 95, whereby the tips 94 of the inserters engage the lower suspended parts of the edge flaps and insert them into the grooves 22, causing each edge flap to come into contact with the adhesive-coated side walls of the respective groove 22, as illustrated in FIG. 14. The pressure cylinders 95 are then reversely energized to withdraw the inserters 93, thereby leaving the edge flaps 18 adhesively secured to both the edge flange 16 and to the groove walls, substantially as illustrated in FIG. 14. The tackiness of the adhesive, and the speed with which it sets up, enables the edge flaps to remain securely joined to the edge frame members of the wall panel structure, whereupon the sweeping and wiping devices can then be disengaged and retracted.

As to this latter disengagement, the carriers 83 and the respective wiping blades 84 are preferably initially retracted sidewardly a small distance away from the panel by energizing the pressure cylinder 92 so that the carrier 83 slides horizontally outwardly relative to the lower end of the vertical support 86. Then the intermediate support 71 is lifted upwardly to return the wiping blades 84 to their raised position, with the carriers 83 again being moved horizontally inwardly to assume their initial position of FIG. 8 by reverse energization of the pressure cylinders 92.

During the retracting of the wiping devices 82, the sweeping devices 62 are also retracted by effecting upward lifting of the lower support 51 so as to effect raising of the carriers 63 and blades 64, which upward raising is accompanied by reverse energization of the cylinders 66 so as to retract the wiping blades inwardly back into the original position as illustrated by FIG. 8.

Figure 15:
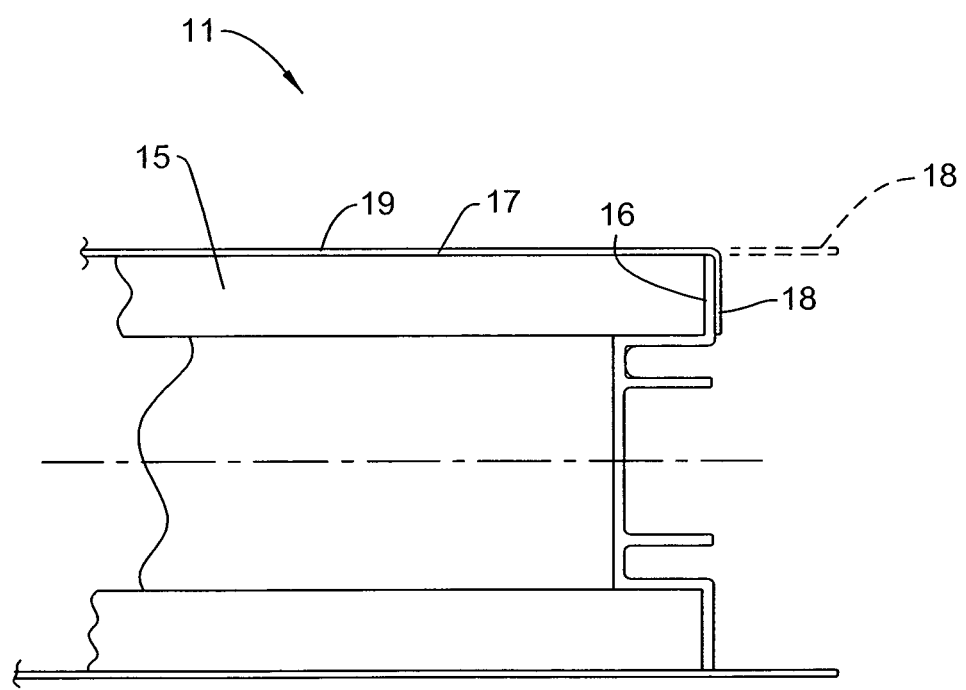

While the operation described above relates to the securement of a cover sheet edge flap 18 having an inner part adhesively secured to a flat exterior surface 16 on the edge frame and also having a lower or free edge part which is adhesively secured within a groove 22, as illustrated by FIG. 14, this being a replacement for the conventional construction illustrated by FIG. 13, it will be appreciated that the present invention is equally applicable for permitting tensioning of the cover sheet and adhesive securement of the edge flap solely to the flat exterior surface of the edge frame, such as the exterior surface of the edge flange 16 substantially as illustrated in FIG. 15. In this variation, a shorter cover sheet edge flap can optimally be used, or alternatively the groove can be eliminated and the surface contact area on the edge flange increased. The operation otherwise corresponds to that described above relative to the variation of FIG. 14 except that utilization of the inserter 93 and the steps associated with activating the inserter are no longer required.

Considering a preferred construction of the sweeping blade arrangements, particularly as diagrammatically illustrated in FIG. 8A, the elastomeric sweeping blade 64 is mounted on the carrier 63, confined between the carrier and a face plate 90. The lower tip end part 65 of the elastomeric blade 64 typically extends or cantilevers downwardly beyond the carrier 64 through only a small distance, such as about 1/16 inch to about 1/4 inch. This provides control over the blades and their compressive engagement with the cover sheet, even when the blades are displaced sideward to tension the sheet, to minimize the potential of damaging the sheet.

As regards the wiping blade arrangement, however, the elastomeric wiping blade 84 is preferably mounted on the cover 83 such that the tip end part 85 thereof protrudes or cantilevers horizontally outwardly through a greater distance, such as in the range of about 1/2 inch to about 3/4 inch. This permits the blade part 85 to initially engage the edge flap 18 adjacent the upper edge or corner 100 of the end face, with the continued downward movement of the wiping blade causing the tip part to resiliently deflect so as to press the flap 18 against the edge surface 16, as illustrated by dotted lines in FIG. 8A.

With the above features and properties of the wiping and sweeping blades, the opposite edge flaps can be simultaneously and uniformly tensioned and wrapped around the edge corners onto the edge surfaces throughout the entire lengths thereof. Specifically, the resiliency of the wiping blades allows them to adjust to, and hence compensate for, any irregularities or distortions in the frame edge rails along the length thereof, such as concave or convex distortions in directions parallel to the plane of the workpiece or transverse thereto. This enables the cover sheet to be snugly engaged against the frame edge rail so as to eliminate voids or pockets under the cover sheet due to the frame distortions which are normally present.

The sweeping blades 64 and wiping blades 84 are preferably constructed of a resilient rubber-like or elastomeric material capable of pressing and frictionally engaging the cover sheet, while at the same time avoiding marking or damaging the cover sheet in contact therewith. The tip ends can be provided with rounded corners or a curved exterior convex configuration to facilitate contact with the cover sheet, as well as resilient deflection of the blade at the tip end. In addition, the wiping blades 84 may be slightly less stiff than the sweeping blades 64 so that additional resiliency or elasticity more readily accommodates engagement of the wiping blades with the frame during downward wiping engagement along the edge faces of the workpiece. This resiliency of the wiping blade also accommodates irregularities in the straightness of the workpiece edge frame rail as well as irregularities or variations in thickness of the cover sheet. As exemplary, the wiping and sweeping blades can be constructed from elastomers having a durometer in the range of about 40 to about 60.

In addition, the stiffness of the sweeping blades 64 at the tip ends thereof, as achieved in part by the confined configuration thereof as described above, enables application of significant downward contact pressure, specifically when the sweeping blades 64 are in the stop and clamp positions adjacent the edges of the workpiece frame, as illustrated in FIG. 9, which assists in straightening or at least minimizing distortion of the elongate frame rails during the subsequent operational steps of attaching the cover sheet edge flaps.

In performing the edge flap securing operation of the present invention, it will be recognized that the workpiece is initially be supplied to the apparatus 30 so as to permit securing of the edge flaps associated with one pair of opposed parallel side edges of the workpiece frame, and thereafter the workpiece may be supplied to a second similar apparatus 30 so as to permit the edge flaps associated with the remaining pair of parallel edges to be fixedly secured. In addition, since many fabric cover sheets have a greater amount of stretch or elasticity in one direction in comparison to the other (i.e., transverse) direction, it is preferable to first secure the edge flaps along the opposite parallel edges which extend generally parallel to the one direction (i.e., the direction of most stretch or elasticity). Thereafter the edge flaps extending transversely (i.e., transverse to the most-stretch direction) of the fabric cover sheet are then secured, with the prior securement of the first edge flaps being effective in minimizing additional stretch or distortion of the cover sheet.

In accordance with the process and apparatus of this invention, the simultaneous tensioning and securement of edge flaps to opposite parallel edge faces of the frame, which securement of the edge flaps along the parallel edge faces occurs substantially simultaneous throughout the length of the individual edge flaps, provides improved control and hence uniformity with respect to the tensioning of the cover sheet during and after the securement thereof to the frame, and thus greatly minimizes irregularities such as wrinkling or puckering of the cover sheet, such as frequently occurs when the securement of the edge flaps is effected progressively along the length thereof in accordance with known conventional techniques. The improved process and apparatus of this invention also provides satisfactory handling of the newer fabrics which have greater looseness of weave, greater elasticity and/or greater slipperiness, while at the same time readily compensating for various thicknesses of fabrics.

It will be understood that the overall apparatus, including the various driving and sensing hardware, can be controlled using conventional systems, processors and/or computerized controllers.

It will also be appreciated that the process and apparatus of this invention can be readily accommodated into an automated assembly-line process having automated conveying systems for feeding the workpiece both into and out of the apparatus 30, with multiple similar apparatus 30 being provided to permit sequential processing of parallel edge pairs associated with one or both sides of the workpiece.

Although a particular preferred embodiment of the invention has been disclosed in detail for illustrative purposes, it will be recognized that variations or modifications of the disclosed apparatus and process, including the rearrangement of parts and steps, lie within the scope of the present invention.

What is claimed is:

1. A process for securing a flexible cover sheet to a panel-shaped substrate, comprising the steps of:

providing a workpiece defined by the panel-shaped substrate having a pair of generally parallel first edge faces which extend generally perpendicular to and between a pair of generally parallel second edge faces, and the flexible cover sheet positioned in an overlying and non-attached relationship to a large side face of said substrate and having flexible edge flaps associated with and extending along each of said edge faces and protruding outwardly therebeyond;

providing a support having an upwardly-facing surface defining a generally horizontal working station adapted for supporting a said workpiece thereon in a horizontal orientation;

horizontally positioning said workpiece on said working station with the cover sheet thereof facing upwardly and the edge flaps protruding outwardly of the respective edge faces of the workpiece;

providing a pair of vertically-movable wiping mechanisms positioned above said working station in a sidewardly spaced relationship and generally above the respective first edge faces of the workpiece, each wiping mechanism including an elastic wiping blade extending generally parallel to the adjacent first edge face throughout the length thereof, said wiping blade projecting generally horizontally in a direction toward the respective edge face and terminating in a free end part;

providing a pair of vertically-movable sweeping mechanisms positioned above the working station in a sidewardly spaced relationship and generally above the respective first edge faces of the workpiece, each sweeping mechanism including a sweeping blade which projects generally vertically downwardly toward the workpiece disposed at the working station and which terminates in a free end part disposed upwardly over the workpiece at a location closely adjacent the respective edge face;

moving said wiping blades simultaneously downwardly from an initial raised position into contact with upper edges of the respective edge faces and the edge flaps protruding outwardly thereof, and continuing the downward movement of the wiping blades so that the tip end parts of the wiping blades engage the edge flaps and wipe them downwardly into pressed contact with respective flat surfaces on the edge faces to effect tensioning of the cover sheet as it extends across the side face transversely between said first edge faces;

moving said sweeping blades simultaneously downwardly from an initial raised position into pressing contact with an up-facing surface of the cover sheet at locations adjacent the respective first edge faces, and stopping the downward movement of the sweeping blades to maintain a holding contact pressure on said cover sheet to maintain the transverse tensioning thereof;

then moving said wiping blades into a position wherein they no longer press the edge flaps into contact with the respective flat surfaces on the edge faces;

then deflecting the edge flaps upwardly into a raised position disposed above the flat surfaces of the respective edge faces;

applying adhesive to said flat surfaces on said edge flaps and/or the back sides of the raised edge flaps;

then displacing the edge flaps so that they hang downwardly adjacent the respective first edge faces;

then moving the wiping blades simultaneously downwardly so that the free end parts of the wiping blades contact the respective edge flaps and press them into contacting engagement with the respective flat surfaces as the wiping blades move downwardly of the first edge faces to adhesively secure the edge flaps to the respective flat surfaces of the first edge faces; and then moving said wiping blades and said sweeping blades back to their respective initial positions.

2. A process according to claim 1, wherein the step of moving the sweeping blades downwardly into pressing contact with the up-facing surface of the cover sheet includes moving the sweeping blades downwardly into contacting engagement with the up-facing surface of the cover sheet and exerting a downward pressure thereon at respective locations spaced a small sideward distance from the respective first edge face, then simultaneously moving the sweeping blades sidewardly in opposite outward directions to positions directly adjacent the respective first edge faces to effect final transverse tensioning of the cover sheet, and then maintaining contacting pressure on the cover sheet to maintain the transverse tensioning thereof.

3. A process according to claim 2, wherein the downward movement of the sweeping blades into pressing contact with the up-facing surface of the cover sheet occurs after the wiping blades have been moved downwardly to effect downward wiping of the edge flaps into pressed contact with the respective flat surfaces.

4. A process according to claim 1, including moving the wiping blades downwardly past the flat surfaces to disengage the wiping blades from the edge flaps after the sweeping blades have been moved into pressing contact with the up-facing surface of the cover sheet, and then moving the wiping blades upwardly deflecting the edge flaps upwardly into said raised position prior to the adhesive applying step.

5. A process according to claim 4, wherein the upward movement of the wiping blades causes the edge flaps to be lifted upwardly into a generally vertical orientation adjacent a backing support, and then maintaining engagement between the free end parts of the wiping blades and upper free end parts of the edge flaps to maintain them in said raised position, and thereafter spraying said adhesive lengthwise along the back sides of the raised edge flaps and also along the exposed flat surfaces of the respective first edge faces.

6. A process according to claim 5, wherein the step of moving the sweeping blade downwardly into pressing contact with the up-facing surface of the cover sheet includes the substeps of initially moving the sweeping blades downwardly into contacting engagement with the up-facing surface of the cover sheet and exerting a downward pressure thereon at locations spaced a small sideward distance from the respective first edge face, then simultaneously moving the sweeping blades sidewardly in opposite outward directions to positions directly adjacent the respective edge faces to effect final transverse tensioning of the cover sheet, and then maintaining contacting pressure on the cover sheet to maintain the tensioning thereof.

7. A process according to claim 6, wherein the downward movement of the sweeping blades into pressing contact with the up-facing surface of the cover sheet occurs after the wiping blades have been moved downwardly to effect downward wiping of the edge flaps into pressed contact with the respective flat surfaces.

8. A process according to claim 1, including providing each edge face of the workpiece with a channel-like groove opening outwardly of the edge face adjacent an inner edge of the respective flat surface and extending lengthwise along the edge face;

providing each said edge flap with a sufficient width to define an inner flap part which adheres to the respective flat surface and an outer flap part adjacent a free outer edge of the flap; and inserting said outer flap part into said groove after said inner flap part has been adhesively secured to the respective flat surface.

9. A process according to claim 8, including applying adhesive to each of the back face of the edge flap, the flat surface, and inner walls defining the groove when the respective edge flap is in the raised position.

10. A process according to claim 8, wherein the step of moving the sweeping blades downwardly into pressing contact with the up-facing surface of the cover sheet includes the substeps of initially moving the sweeping blades downwardly into contacting engagement with the up-facing surface of the cover sheet and exerting a downward pressure thereon at locations spaced a small sideward distance from the respective edge face, then simultaneously moving the wiping blades sidewardly in opposite outward directions to positions directly adjacent the respective edge faces to effect final tensioning of the cover sheet, and then maintaining contacting pressure on the cover sheet to maintain the tensioning thereof; and

- the downward movement of the sweeping blades into pressing contact with the up-facing surface of the cover sheet occurring after the wiping blades have been moved downwardly to wipe the edge flaps into pressed contact with the respective flat surfaces.

11. A process according to claim 10, including moving the wiping blades downwardly past the flat surfaces to disengage the wiping blades from the edge flaps after the sweeping blades have been moved into pressing contact with the up-facing surface of the cover sheet, and then moving the wiping blades upwardly so that the wiping blades lift the edge flaps upwardly into said raised positions prior to the adhesive applying step.

* * * * *